(12) United States Patent
Cypher

(10) Patent No.: US 8,271,735 B2
(45) Date of Patent: Sep. 18, 2012

(54) CACHE-COHERENCY PROTOCOL WITH HELD STATE

(75) Inventor: Robert E. Cypher, Saratoga, CA (US)

(73) Assignee: Oracle America, Inc., Redwood Shores, CA (US)

(*) Notice: Subject to any disclaimer, the term of this patent is extended or adjusted under 35 U.S.C. 154(b) by 920 days.

(21) Appl. No.: 12/352,933

(22) Filed: Jan. 13, 2009

(65) Prior Publication Data

US 2010/0180084 A1    Jul. 15, 2010

(51) Int. Cl.
*G06F 12/00* (2006.01)
(52) U.S. Cl. ............... 711/130; 711/141; 711/E12.022
(58) Field of Classification Search .................. 711/135, 711/141, E12.022, 130
See application file for complete search history.

(56) References Cited

U.S. PATENT DOCUMENTS

| 2007/0168617 A1* | 7/2007 | Borkenhagen et al. ....... 711/133 |
| 2008/0147991 A1* | 6/2008 | Clark et al. .................... 711/146 |
| 2010/0088472 A1* | 4/2010 | Ukai ............................. 711/130 |

* cited by examiner

*Primary Examiner* — Kevin Ellis
*Assistant Examiner* — Mehdi Namazi
(74) *Attorney, Agent, or Firm* — Park, Vaughan, Fleming & Dowler LLP

(57) ABSTRACT

A new "held" ("H") cache-coherency state is introduced for directory-based multiprocessor systems. Using the held state enables embodiments of the present invention to track sharers that have a shared copy of a cache line after a directory runs out of space for holding information that identifies processors that have received shared copies of the cache line (e.g., pointers to sharers of the cache line). In these embodiments, when a directory entry is full, the system provides subsequent shared copies of the cache line to sharers in the held state and tracks the identity of the held-copy owners in a data field in the entry for the cache line in a home node.

19 Claims, 6 Drawing Sheets

CACHE-COHERENCY PROTOCOL WITH HELD STATE

BACKGROUND

1. Field of the Invention

Embodiments of the present invention relate to techniques for improving the performance of computer systems. More specifically, embodiments of the present invention relate to cache-coherency protocols for multi-processor systems.

2. Related Art

Modern multiprocessor systems include a number of processors which are coupled to a memory hierarchy. The memory hierarchy typically includes one or more levels of cache memories and a main memory which are shared between the processors. In such systems, shared cache lines can be accessed by any of the processors, and the systems use a cache-coherency mechanism to control access to the shared cache lines. These cache-coherency mechanisms typically enforce a cache-coherency protocol that dictates the ways in which processors in the system can access cache lines. For example, one common cache-coherency protocol is the MESI protocol, which provides four possible states in which cache lines in the system can be held: modified (M), exclusive (E), shared (S), and invalid (I).

Some multiprocessor systems use a directory-based cache-coherency mechanism to maintain cache lines in a coherent state. In such systems, a directory keeps track of status information for cache lines in the system. For example, the directory can keep track of which processors in the system have a shared copy of a given cache line. Unfortunately, the amount of circuitry required to implement such a directory increases as the number of sharers (i.e., processors) in the system increases. This increased circuitry requires more semiconductor area and consumes more power.

To avoid increasing the size of the directory as the number of sharers increases, some designers have proposed techniques that reduce the amount of information stored in the directory. One such technique uses a coarse bit-mask for a shared cache line to keep an approximate record of the identities of processors that have a shared copy of the cache line. In this approach, each bit in the bit-mask represents two or more processors that can have a shared copy of the cache line. Unfortunately, the coarse bit-mask approach has scalability problems. More specifically, because each bit represents a number of sharers, when a sharer needs to be invalidated, all other sharers that are identified using the same bit must also be invalidated.

SUMMARY

Embodiments of the present invention provide a system that maintains cache coherency. During operation, the system (e.g., computer system 100 in FIG. 1) receives a request from a processor for a copy of a cache line in a shared state. The system then determines if space is available for information that identifies the processor in a directory entry for the cache line. If so, the system provides to the processor the copy of the cache line in the shared state and adds the information that identifies the processor to the directory entry for the cache line. Otherwise, if space is not available for the information that identifies the processor in the directory entry for the cache line, the system provides a copy of the cache line to the processor in a held state, and writes information that identifies the processor in a data field of the cache line at the home node for the cache line.

In some embodiments, while determining if space is available for the information that identifies the processor in the directory entry for the cache line, the system determines a number of processors that have received a copy of the cache line in the shared state and a number of processors that have a copy of the cache line in the held state.

In some embodiments, providing a copy of the cache line to the processor in the held state involves determining that no processors have a copy of the cache line in the held state and that exactly X processors have received a copy of the cache line in the shared state and may still have a copy of the cache line in the shared state, wherein X is a parameter of the cache coherence protocol. In this case, the system sends from the home node to the processor a copy of the cache line in the held state. The system also invalidates the cache line at the home node, wherein invalidating the cache line at the home node involves updating the directory entry to indicate that at least some sharer information is held in the cache line at the home node. The system also clears data in the cache line at the home node. Otherwise, if one or more processors have a copy of the cache line in the held state, the system requests that a copy of the cache line be sent from a processor with a held copy or owned copy of the cache line to the processor in the held state.

In some embodiments, providing the copy of the cache line to the processor in the shared state involves determining that fewer than X processors have received a copy of the cache line in the shared state and no processors have a copy of the cache line in the held state. If so, the system sends a copy of the cache line from the home node to the processor in the shared state.

In some embodiments, the system receives a request from a held-copy owner to evict a copy of a held cache line. The system then determines if at least one other processor has a copy of the held cache line in the held state. If so, the system removes information that identifies the held-copy owner from the held cache line at the home node. Otherwise, if no other processor has a copy of the held cache line in the held state, the system requests that a copy of the held cache line be sent to the home node from the held-copy owner. Next, the system stores at the home node data from the copy of the held cache line, thereby overwriting the information that identifies the held-copy owner. Then, the system grants permission to the held-copy owner to evict the copy of the held cache line.

In some embodiments, a processor that has a copy of a cache line in the shared state can evict the copy of the cache line without requesting permission to evict the copy of the cache line. In some embodiments, a processor that has a copy of a cache line in the held state must request permission to evict a copy of the cache line and must wait for acknowledgment to the request before evicting the copy of the cache line.

DETAILED DESCRIPTION

Figure 1:
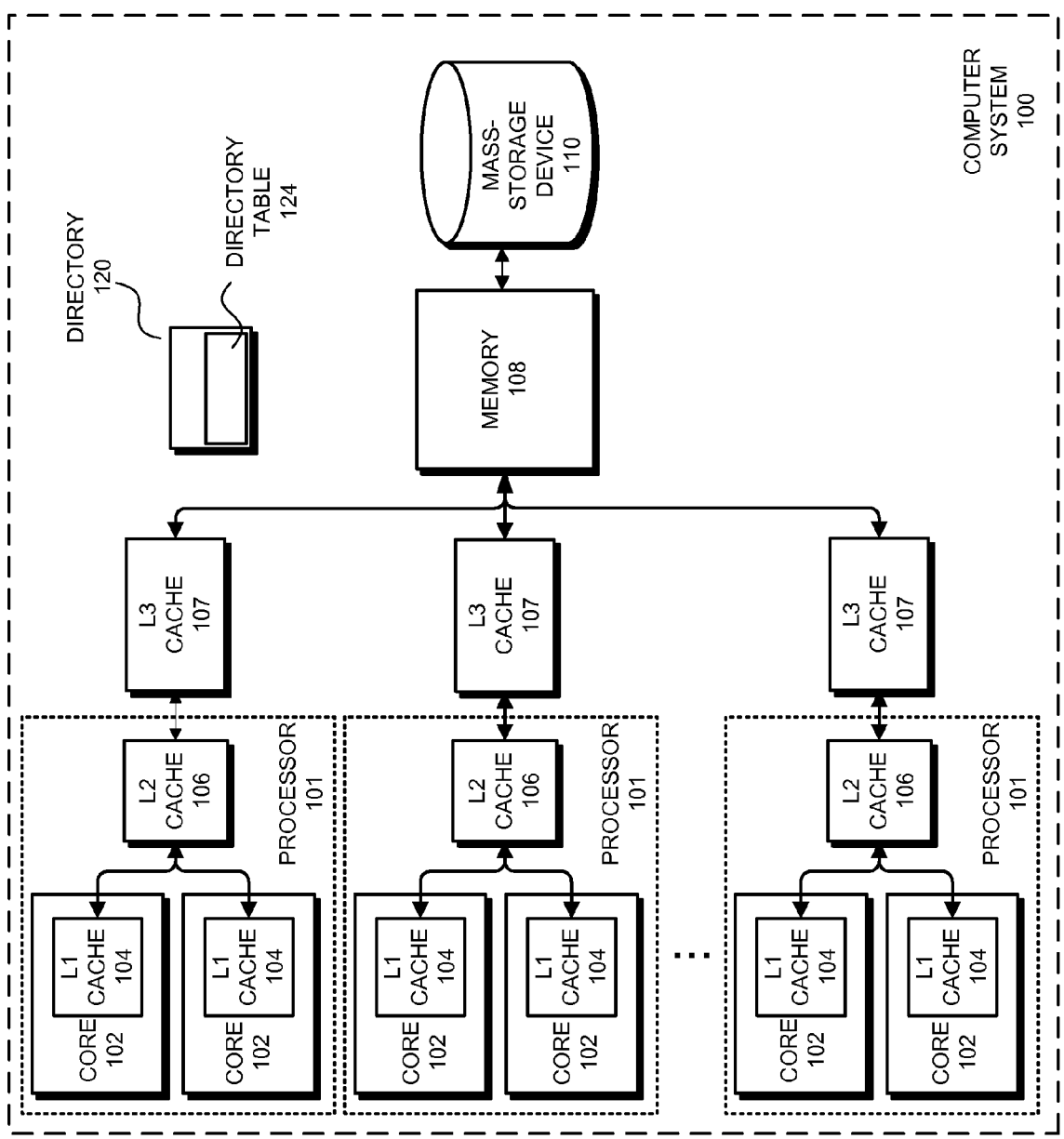
FIG. 1 presents a block diagram of a computer system in accordance with embodiments of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The methods and processes described below can be embodied in hardware modules. For example, the hardware modules can include, but are not limited to, application-specific integrated circuit (ASIC) chips, field-programmable gate arrays (FPGAs), and other programmable-logic devices now known or later developed. For example, in some embodiments of the present invention, the hardware modules include a microprocessor, such as processor 101 (see FIG. 1), a directory 120, a memory 108, L1 caches 104, or other such hardware modules. When the hardware modules are activated, the hardware modules perform the methods and processes embodied within the hardware modules.

The methods and processes described below can also be embodied as code and/or data, which can be stored in a computer-readable storage medium. The computer-readable storage medium may be any device or medium that can store code and/or data for use by a computer system. When a computer system reads and executes the code and/or data stored on the computer-readable storage medium, the computer system performs the methods and processes embodied as data structures and code and stored within the computer-readable storage medium. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Terminology

Throughout the description, we use the following terminology in describing embodiments of the present invention. These terms are generally known in the art, but are defined below to clarify the subsequent descriptions.

States of cache lines are described in accordance with the common "MESI" cache-coherency protocol, an overview of which is provided in the following section. Additionally, terms such as "S-copy owner" or "shared-copy owner" refer to a processor and/or a cache that has received a copy of a cache line in the shared (S) state, in accordance with the MESI protocol. Note that a processor that has "received" a shared copy of the cache line may still have the shared copy, or it may have silently evicted the shared copy. A directory entry for the cache line can indicate the processor is a potential sharer even after the processor has evicted the shared copy of the cache line.

Embodiments of the present invention use a new cache-coherency state in addition to the conventional MESI states: the "held" (H) state (which is described in detail below), resulting in the new "MESHI" protocol. The terms "H-copy owner" or "held-copy owner" refer to a processor and/or cache that has a copy of the cache line in the held state. Note that the MESHI protocol is understood to be the MESI protocol which is extended to include the held state. Note also that embodiments of the present invention are operable with other variants of the MESI protocol, including the MOSI protocol, the MOESI protocol, etc.

Within the following description, a "sharer" is a processor and/or cache that has or requests a copy of a cache line (which can be the shared state or another state). A "shared cache line" is a cache line that can be shared, i.e., a cache line for which copies can reside in one or more caches in a read-only state.

Note that throughout this description, one possible storage location for a cache line may also be referred to as the "home node" for a cache line. Generally, the home node is the processor, memory, or processor with memory that holds the cache line and the directory entry for the cache line. For example, one such home node is a memory controller that includes a directory.

Note that throughout this description a directory entry for the cache line is said to include "sharer information", or "information that identifies a processor." Generally, a directory entry for a cache line can include any type of information that facilitates identifying a potential sharer, e.g. information that identifies a potential sharer that has a copy of a cache line in a held state, or has received a copy in a shared state. For example, the directory entry can contain a pointer, e.g. a numerical ID associated with the processor. Or, the directory entry can contain a bitmask, wherein each bit in the bitmask represents one or more potential sharers.

Cache-Coherency Protocol

Embodiments of the present invention use a cache-coherency protocol to ensure that copies of cache lines from a shared memory 108 (see FIG. 1) remain consistent. For example, some embodiments of the present invention use the "MESI" protocol. MESI is an acronym that represents the states in which a cache line can be held in processor 101 (i.e., in an L1 cache 104 associated with a core 102, or in an L2 cache 106 associated with processor 101) and/or in memory 108. The states include "modified" (M), "exclusive" (E), "shared" (S), and "invalid" (I). (Note that although we describe embodiments of the present invention using the MESI protocol, alternative embodiments of the present invention that operate with other coherence protocols function similarly.)

A processor 101 that has a copy of a given cache line in the M state has a current, valid copy of the cache line. For such a cache line, the copy of the cache line in memory 108 is stale and no other processor 101 has a copy. Moreover, a processor 101 that has a cache line in the M state has both read and write permission for the cache line, so the processor 101 can freely read from and write to the cache line.

A processor 101 that has a copy of a cache line in the E state has a current, valid copy of the cache line. For such a cache line, the copy in memory 108 is also the current, valid copy of the cache line. However, no other processor 101 has a copy of the cache line (and hence the cache line is "privately" held). In addition, a processor 101 that has a cache line in the E state has read-only permission for the cache line. Moreover, a cache line in the E state can typically be silently evicted from the processor without requesting permission. Furthermore, a cache line in the E state can typically be silently upgraded to the M state, in order to provide write-permission to the cache line, without requesting permission.

A processor 101 that has a copy of a cache line in the S state has a current, valid copy of the cache line. The copy in memory 108 is also a current, valid copy of the cache line. Additionally, one or more other processors 101 in computer system 100 may also have copies of the cache line in the S state. Moreover, a processor 101 that has a cache line in the S state has read-only permission for the cache line. Furthermore, a cache line in the S state can typically be silently evicted from the processor without requesting permission.

A processor 101 that has a copy of a cache line in the I state does not have a valid copy of the cache line. However, valid copies of the cache line may be held in memory 108 or in another processor 101. Note that when a processor 101 has no data in a given cache line (e.g., at startup), the cache line is in the I state. Moreover, a processor 101 that has a cache line in the invalid state has no read or write permission for the cache line.

The Held State

In addition to the coherency states included in the MESI protocol, embodiments of the present invention use a new cache-coherency state: the "held" or "H" state. Using the held state enables these embodiments to continue to track sharers that have a copy of the cache line after the directory runs out of space for holding sharer information (i.e., information that identifies one or more processors that have received a copy of the cache line) for the cache line. Generally, when a cache line resides in any cache in the held state, sharer information is stored in the data field of the cache line at the home node for the cache line (i.e., "in" the cache line at the home node).

More specifically, in embodiments of the present invention, sharer information that identifies a predetermined number ("X") of processors that have received a copy of the cache line in the shared state will fit in an associated directory entry for a cache line. Thus, these embodiments can fulfill X requests from processors for copies of a cache line in the shared state by sending to the requesting processors copies of the cache line in the shared state and updating the directory entry for the cache line to include information that identifies the requesting processors.

However, after X copies of the cache line have been provided to the first X sharers, sharer information will not fit in the directory entry. Thus, embodiments of the present invention fulfill subsequent requests for shared copies of the cache line by instead providing copies of the cache line in the held state. When a first copy of a cache line is provided in the held state, a copy of the cache line is provided to the requester from the home node or an existing sharer, and then the data field of the cache line is updated at the home node to include information that identifies the requestor. (Note that this means that the cache line data itself is no longer contained in the home node for the cache line.)

Updating the data field of the cache line can involve clearing the data field of the cache line at the home node and writing information that identifies the held-copy owner in the data field. Alternatively, if the data field of the cache line already contains information that identifies one or more held-copy owners, updating the data field can involve adding/appending sharer information to existing sharer information in the data field. Updating the data field of the cache line can also involve changing the directory entry of the cache line to indicate that the cache line no longer contains data at the home node, but instead contains information that identifies held-copy owners.

Recall that having a copy of a cache line in a shared state means that the shared-copy owner has read-only access to the cache line, and may evict the copy of the cache line silently at any time. In addition, having a copy of the cache line in the held state means that the held-copy owner has read-only access to the cache line, but, unlike with a copy of the cache line in the shared state, the held-copy owner cannot silently evict the copy of the cache line in the held state. This is true because the held copy owner may be the last sharer to have the cache line and may need to write the cache line back to the home node so that a copy of the cache line is preserved in the computer system.

Computer System

FIG. 1 presents a block diagram of a computer system 100 in accordance with embodiments of the present invention. Computer system 100 includes processors 101, L3 caches 107, memory 108, and mass-storage device 110. In addition, computer system 100 includes directory 120 and directory table 124.

Each processor 101 is a multi-core processor that includes two or more separate processor cores 102 integrated into a single semiconductor die (i.e., a chip-level multiprocessor). Alternatively, processor 101 can include two or more separate semiconductor dies, each including one or more processor cores 102 integrated in one package. In these embodiments, each processor core 102 functions as a separate general-purpose processor that performs computational operations. For example, each processor core 102 can be a central processing unit (CPU), such as a microprocessor, a controller, or an application-specific integrated circuit. Note that there are numerous possible CPU architectures (e.g., reduced instruction set computer (RISC), complex instruction set computer (CISC), superscalar, or multi-threaded) for processor cores 102. Such CPU architectures are well-known in the art and, hence, are not described in further detail.

Each processor core 102 includes an L1 cache 104, while each processor 101 includes an L2 cache 106 that is shared by the processor cores 102. Computer system 100 also includes a separate L3 cache 107 for each processor 101.

Mass-storage device 110 is a high-capacity, non-volatile computer-readable storage device, such as a disk drive or a large flash/solid-state memory, with a large access time. Memory 108, L3 cache 107, L2 cache 106, and L1 cache 104 are computer-readable storage devices that collectively form a memory hierarchy that stores data and instructions for each core 102. In comparison to mass-storage device 110, L1 cache 104, L2 cache 106, L3 cache 107, and memory 108 are smaller, faster memories that store copies of frequently used data. For example, memory 108 can be a large dynamic random access memory (DRAM) structure, whereas L1 cache 104, L2 cache 106, and L3 cache 107 can be comprised of smaller static random access memories (SRAMs) or DRAMs. In some embodiments, L3 caches 107 are implemented in DRAM along with memory 108. Portions of the memory hierarchy can be coupled together by a communications link (e.g., a memory bus) that facilitates transferring communications and data between memory 108, L3 cache 107, L2 cache 106, and processor 101/L1 cache 104. Such memory structures are well-known in the art and are therefore not described in further detail.

In some embodiments of the present invention, computer system 100 includes one or more separate functional blocks (not shown) for controlling the operation of the memory hierarchy. For example, computer system 100 can include a memory controller and/or other circuit structures. The functional blocks may operate with directory 120 to control the operation of the memory hierarchy. In some embodiments, the functional blocks can operate in combination with separate controllers within the elements of the memory hierarchy. For example, in some embodiments, each processor 101 includes one or more memory controllers, cache-coherency mechanisms, and/or other functional blocks (not shown) that enable the processors 101 to communicate memory operations (such as cache line accesses) to one another. The functional blocks used to control the operation of the memory hierarchy are well-known in the art and are therefore not described in further detail.

In embodiments of the present invention, L1 cache 104, L2 cache 106, L3 cache 107, and memory 108 are logically partitioned into a number of cache lines that store data. Starting from memory 108 and proceeding to L1 cache 104 (right to left in FIG. 1), each level of the memory hierarchy contains fewer cache lines than the next higher level.

In some embodiments of the present invention, some or all of the caches are "set-associative." Generally, in a set-associative cache, the entries in the cache are logically divided into a number of "sets." A "set" is a group of cache entries that are used to store cache lines from the same predetermined set of physical addresses. In some embodiments of the present invention, some or all of the caches are "direct-mapped." In these embodiments, a separate set of physical addresses maps to each cache line in the cache.

Directory 120 is a circuit structure that maintains cache-coherency information for computer system 100 in directory table 124. Directory 120 may contain additional control circuitry (not shown) to control the operation of directory 120. In some embodiments, directory 120 is a directory for a large cache (e.g., an L3 cache, or a DRAM-based cache), which caches data that is shared between processors 101 and/or cores 102. Without loss of generality, embodiments of this invention are applicable to any computer system cache, regardless of the type of data that is cached.

Computer system 100 can be incorporated into many different types of electronic devices. For example, computer system 100 can be part of a desktop computer, a laptop computer, a server, a media player, an appliance, a cellular phone, testing equipment, a network appliance, a calculator, a personal digital assistant (PDA), a hybrid device (e.g., a "smart phone"), a guidance system, audio-visual equipment, a toy, a control system (e.g., an automotive control system), manufacturing equipment, or another electronic device.

Although we describe computer system 100 as comprising specific components, in alternative embodiments different components can be present in computer system 100. For example, in some embodiments, computer system 100 can include video cards, network cards, optical drives, and/or other peripheral devices that are coupled to each processor 101 using a bus, a network, or another suitable communication link.

Note that although computer system 100 is shown with three processors 101 with two cores each, computer system 100 can include a different number of processors 101 and/or a different number of cores 102 per processor 101.

Directory Table

Figure 2:
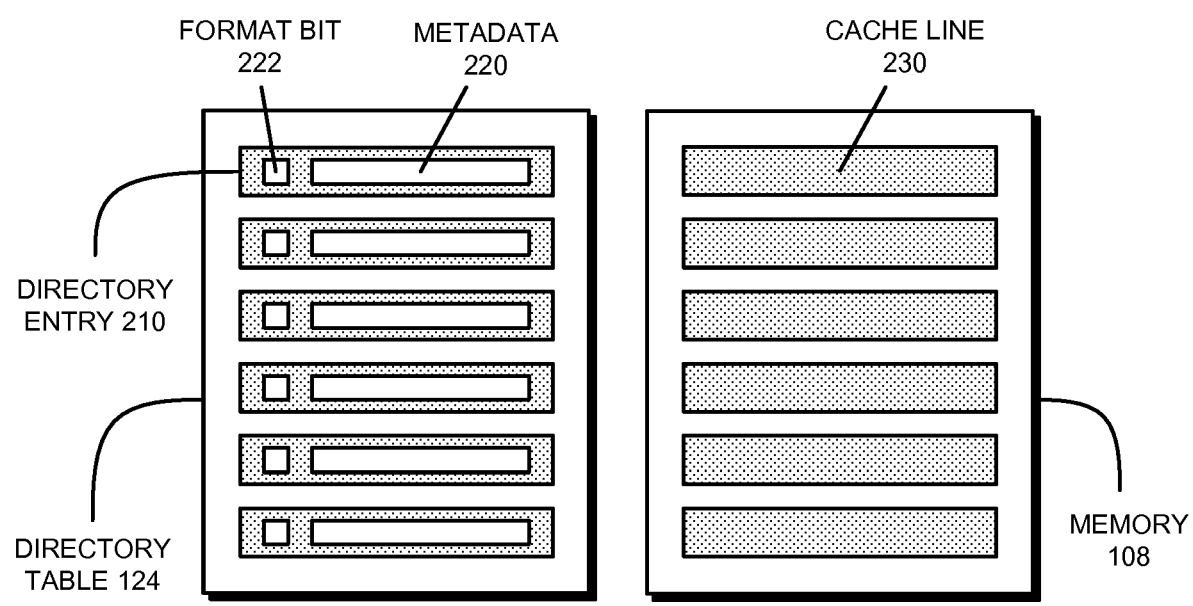
FIG. 2 presents a block diagram illustrating a directory table and a portion of a cache memory in accordance with embodiments of the present invention.

FIG. 2 presents a block diagram illustrating a directory table and a portion of a cache memory in accordance with embodiments of the present invention. Specifically, FIG. 2 presents a block diagram illustrating cache lines 230 in memory 108, and their corresponding directory entries 210 in directory table 124.

Directory table 124 includes a directory entry 210 for each shared cache line 230. Each directory entry 210 includes format bit 222, which facilitates using two different formats for directory entry 210. If format bit 222 is 0 (first format), cache line 230 contains valid cache data at the home node, and directory entry 210 can contain sharer information. Otherwise, if format bit 222 is 1 (second format), cache line 230 does not contain valid data at the home node, but instead contains information that identifies one or more processors that have a copy of cache line 230 in the held (H) state.

Note that sharer information, whether in a directory entry 210 or in the cache line, can include information that identifies one (or more) sharers that have received a shared copy of the cache line. For example, sharer information can include information that identifies a processor that has received a copy of the cache line in the shared state, or a processor that has a copy of the cache line in the held state.

Each directory entry 210 also includes metadata 220. Metadata 220 contains cache-coherence information for cache line 230 corresponding to directory entry 210. For example, metadata 220 can include storage for information that identifies a predetermined number of processors that have received shared copies of cache line 230. Metadata 220 can also include a state field that is used to track the state of cache line 230 in accordance with the MESI protocol.

Directory table 124 can be stored in any memory (e.g., memory 108 or L3 cache 107). Cache lines 230 and corresponding directory entries 210 may be stored in separate memory modules, separate memory structures, or non-contiguous memory addresses of the same memory. In some embodiments of the present invention, cache lines 230 and corresponding directory entries 210 are stored in the same memory module and/or memory structure.

Some embodiments of the present invention reduce the amount of memory required to store directory 120 by using error correcting code (ECC) memory, such as ECC DRAM memory modules. ECC memory modules contain a data portion (i.e., data bits) for storing data, and also include extra bits known as "parity bits," or "check bits," which typically store error detecting and/or correcting information. Some embodiments of the present invention reduce or eliminate memory requirements for directory 120 by storing directory entry 210 in some (or all) of the parity bits of a memory address in ECC memory, and storing cache line 230 in the data portion of the memory address.

Other embodiments of the present invention combine metadata 220 with ECC data to maintain ECC functionality while also reducing or eliminating memory requirements for directory 120. For example, some embodiments of the present invention combine metadata 220 with error detecting and/or correcting information and store metadata 220 in some (or all) of the parity bits of an ECC memory module, as described earlier.

Directory Entry Formats

Figure 3A:
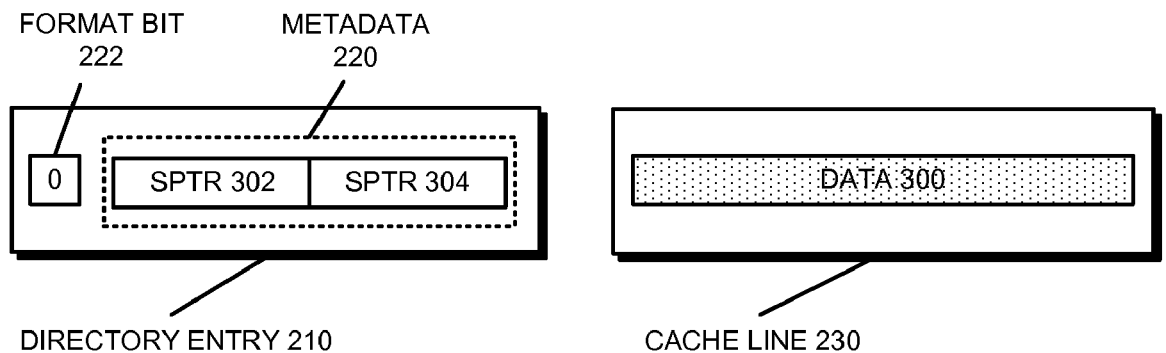
FIG. 3A presents a block diagram illustrating an exemplary directory entry and a corresponding cache line containing valid data in accordance with embodiments of the present invention.

FIG. 3A presents a block diagram illustrating an exemplary directory entry 210 and corresponding cache line 230 containing valid data 300, in accordance with embodiments of the present invention.

FIG. 3A shows one possible format for directory entry 210 and corresponding cache line 230. Illustratively, format bit 222 is 0, which indicates that cache line 230 contains valid data 300. Metadata 220 contains two pointers to processors that have received copies of the cache line in the shared state, SPTR 302 and SPTR 304. Note that metadata 220 includes only two pointers (X=2) for the purposes of illustration—other embodiments of the present invention may store a different number of pointers in metadata 220. For example, embodiments with X=0 (that is, no pointers for copies in the shared state) are possible.

SPTR 302 and SPTR 304 each include information that identifies a processor (or possibly a number of processors) that has a copy of cache line 230 in the shared state. For example, SPTR 302 and SPTR 304 can each be an integer ID that identifies a processor 101 that has received a copy of cache line 230 in the shared state.

As shown in FIG. 3A, cache line 230 contains valid data 300 in a data field for the cache line. In embodiments of the present invention, in accordance with the applicable coherency protocol, cache line 230 at the home node generally contains valid data for a shared cache line until there are one or more processors that have that cache line in the held (H) state.

Figure 3B:
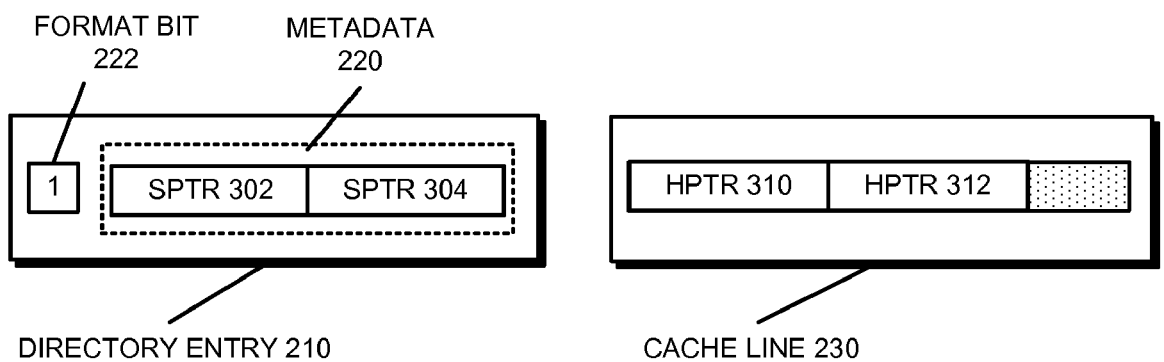
FIG. 3B presents a block diagram illustrating an exemplary directory entry and a corresponding cache line containing pointers to held-copy owners in accordance with embodiments of the present invention.

FIG. 3B presents a block diagram illustrating a directory entry 210 and corresponding cache line 230 containing pointers to held-copy owners, in accordance with embodiments of the present invention.

FIG. 3B shows a second possible format for directory entry 210 and corresponding cache line 230. As was described earlier with reference to FIG. 3A, metadata 220 includes pointers SPTR 302 and SPTR 304. In the second format shown in FIG. 3B format bit 222 is 1, which indicates that cache line 230 includes information that identifies at least one processor that has a copy of the cache line in the held state. Illustratively, cache line 230 includes pointers HPTR 310 and HPTR 312, each of which includes information that identifies a processor that has a copy of cache line 230 in the held state. Note that in other embodiments of the present invention, cache line 230 may include any number of pointers to processors that have a copy of the cache line in the held state.

One example embodiment (not shown) is implemented on a 64-processor system with 64-byte cache lines and a MSHI protocol with X=2. (Note that for purposes of illustration, X is the maximum number of pointers that fit in metadata 220 of directory entry 210). In this exemplary embodiment, processors are assigned numerical IDs from 0-63, and pointers contain 6 bits to accommodate the 64 processors; therefore, 1 out of 64 sharers can be tracked per pointer. The home node stores 2 state bits in metadata 220 to indicate the state of the cache line according to the MSHI protocol, i.e., "M," "S," "H," or "I." (Note that the functionality of format bit 222 is included in the 2 state bits, i.e., one of the four state encodings corresponds to setting format bit 222 in directory entry 210.) In this exemplary embodiment, metadata 220 is 13 bits wide, which allows metadata 220 to hold at most 2 pointers. (Note that 12 bits are used for the two 6-bit pointers and the 13th bit is used as a valid flag for the second pointer). In this exemplary embodiment, the first two sharers receive copies of the cache line in the shared state, but successive sharers receive copies of the cache line in the held state.

Another exemplary embodiment (not shown) is implemented on a 64-processor system with 64-byte cache lines and an MHI protocol with X=0. In this exemplary embodiment, the home node uses a single bit in metadata 220 to indicate that cache line 230 is valid at the home node. All sharers of cache line 230 receive copies of the cache line in the held state, because metadata 220 cannot hold any pointers (X=0). When a copy of the cache line is requested in the modified or held state, the home node stores an indicator of whether the copy is in the modified or held state, and then uses a 64-bit bit-mask to track the locations of the copies in the held state. The bit-mask may then be stored in the invalidated cache line.

Operating Using the Held State

Figure 4A:
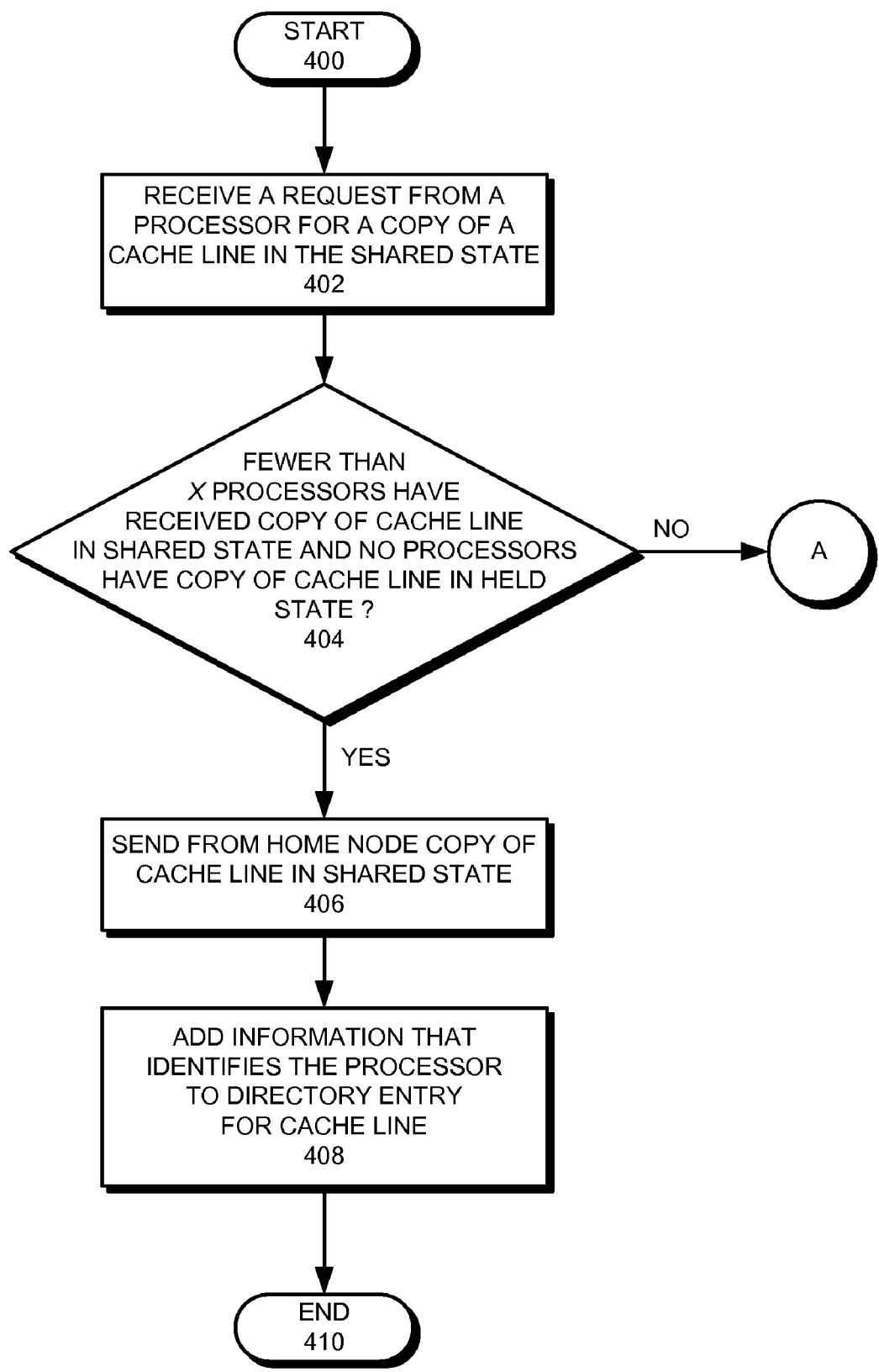
FIGS. 4A-4B present flowcharts illustrating a process for maintaining cache coherency using held states in accordance with embodiments of the present invention.
Figure 4B:
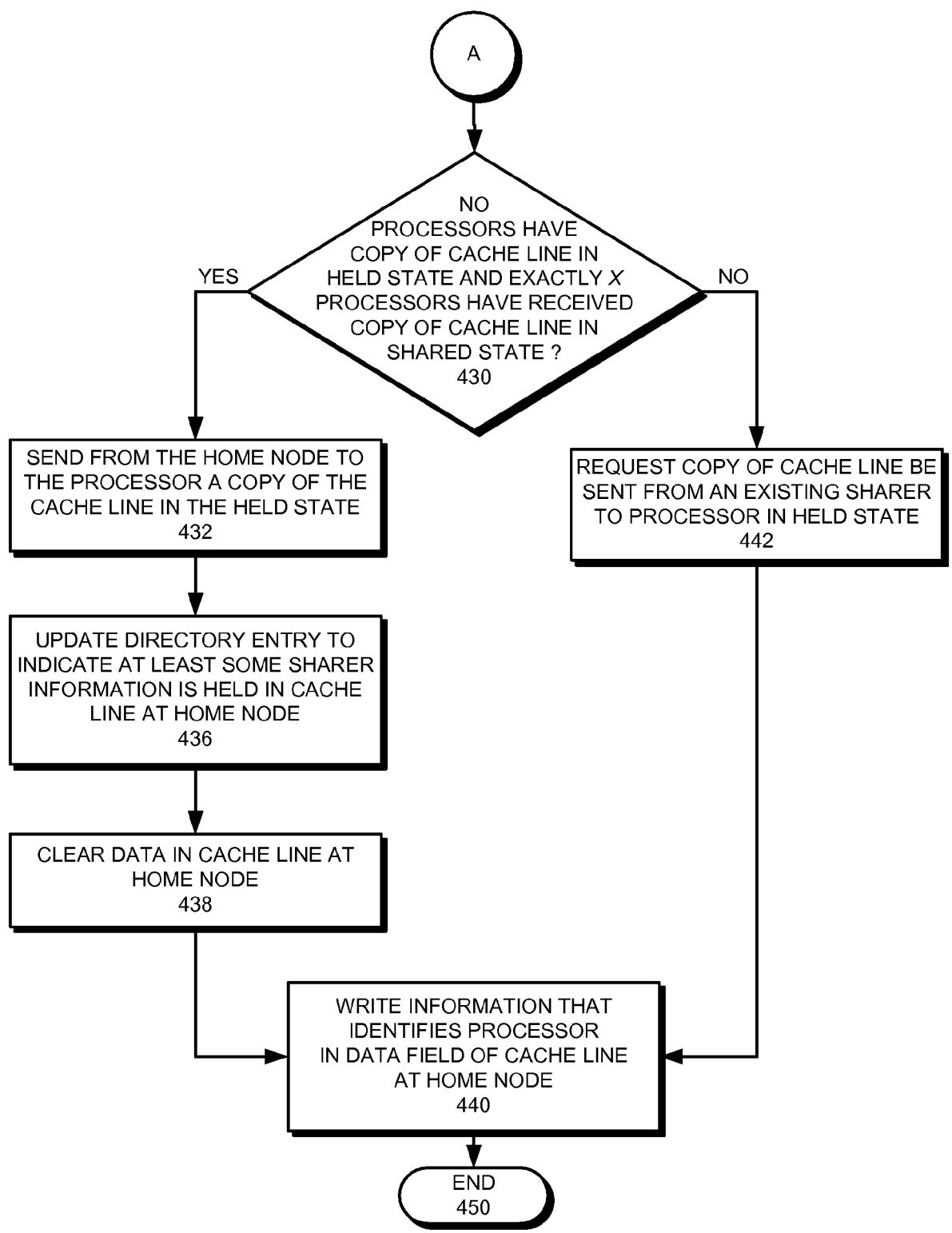

FIGS. 4A-4B present flowcharts illustrating a process for maintaining cache coherency using held states in accordance with embodiments of the present invention. Referring to FIG. 4A, the process starts when directory 120 receives a request from a processor 101 (or core 102) for a copy of a cache line in a shared state (step 402). Note that directory 120 receives the request because directory 120 is associated with the home node for cache line 230. In some embodiments, directory 120 is stored in a memory controller that controls the operation of directory 120.

Next, directory 120 determines if there is space available for information that identifies the processor in a directory entry for the cache line. In some embodiments of the present invention, determining if there is space available for the information that identifies the processor involves determining if fewer than X processors have received a copy of the cache line in the shared state and no processors have a copy of the cache line in the held state (step 404).

If fewer than X processors have received a copy of the cache line in the shared state and no processors have a copy of the cache line in the held state (step 404, Yes), directory 120 sends from the home node to the processor a copy of the cache line in the shared state (step 406). Directory 120 then adds information that identifies the processor in the directory entry for the cache line (step 408). For example, with reference to FIG. 3A, directory 120 can add pointer SPTR 304 to metadata 220 in directory entry 210.

If exactly X processors have received a copy of the cache line in the shared state or at least one processor has a copy of the cache line in the held state (step 404, No), directory 120 provides to the processor a copy of the cache line in the held state, and writes information that identifies the processor in the data field of the cache line at the home node.

The process of providing the cache line to the processor in the held state is described in further detail with reference to FIG. 4B, which continues the flowchart of FIG. 4A, as indicated by the circle "A" in FIGS. 4A and 4B. Referring to FIG. 4B, when providing the copy of the cache line in the held state, directory 120 first determines if no processors have a copy of the cache line in the held state and exactly X processors have received a copy of the cache line in the shared state (step 430). (Recall that X is the maximum number of processors for which sharer information will fit in metadata in the directory entry for the cache line).

If no processors have a copy of the cache line in the held state and exactly X processors have received a copy of the cache line in the shared state (step 430, Yes), directory 120 sends from the home node to the processor a copy of the cache line in the held state (step 432).

Then, directory 120 invalidates the cache line at the home node, which involves updating the directory entry for the cache line to indicate that at least some sharer information is held in the cache line at the home node (step 436). For example, with reference to FIG. 3B, directory 120 can set format bit 222 of directory entry 210 corresponding to cache line 230 to 1, which indicates that cache line 230 at the home node holds pointer HPTR 310. Then, directory 120 clears data in the cache line at the home node (step 438). For example, with reference to FIG. 3A, directory 120 can clear data 300 in cache line 230.

Next, directory 120 writes information that identifies the processor in a data field of the cache line at the home node (step 440). For example, with reference to FIG. 3B, directory 120 can write pointer HPTR 310 in the data field of cache line 230. Note that writing pointer HPTR 310 in the data field of cache line 230 overwrites valid data in the cache line, i.e., HPTR 310 overwrites data 300 (with reference to FIG. 3A). Note further that sharer information can contain an identity of at least one processor that has the cache line in the held state, for example, one or more bits that identify the held-copy owner.

If one or more processors have a copy of the cache line in the held state (step 430, No), directory 120 sends a "copy-back" request to an existing sharer, i.e. a request to an existing sharer to send to the processor a copy of the cache line (step 442). (Note that the existing sharer may have the copy of the cache line in the held state, or the owned state.) In response to the copy-back request, the processor that requested the shared copy receives a copy of cache line 230 in the held state. Then, directory 120 adds information that identifies the processor in the data field of cache line 230 at the home node (step 440).

Note that the steps in invalidating a cache line at the home node may occur in a different order. For example, in embodiments of the present invention, clearing data in the cache line (step 438) occurs before updating the directory entry (step 436). Moreover, these operations may occur as part of an atomic operation, which prevents partial data from being read from the cache line.

Note that the information directory 120 writes in the data field of the cache line, i.e., the information that identifies the held-copy owner, can be different from the information that directory 120 stores in metadata in the directory entry for the cache line. For example, directory 120 can store a bit-mask in the data field of the cache line to identify a held-copy owner, and a pointer in metadata in the directory entry for the cache line to identify a shared-copy owner.

Method for Acknowledging an Eviction Request

Figure 5:
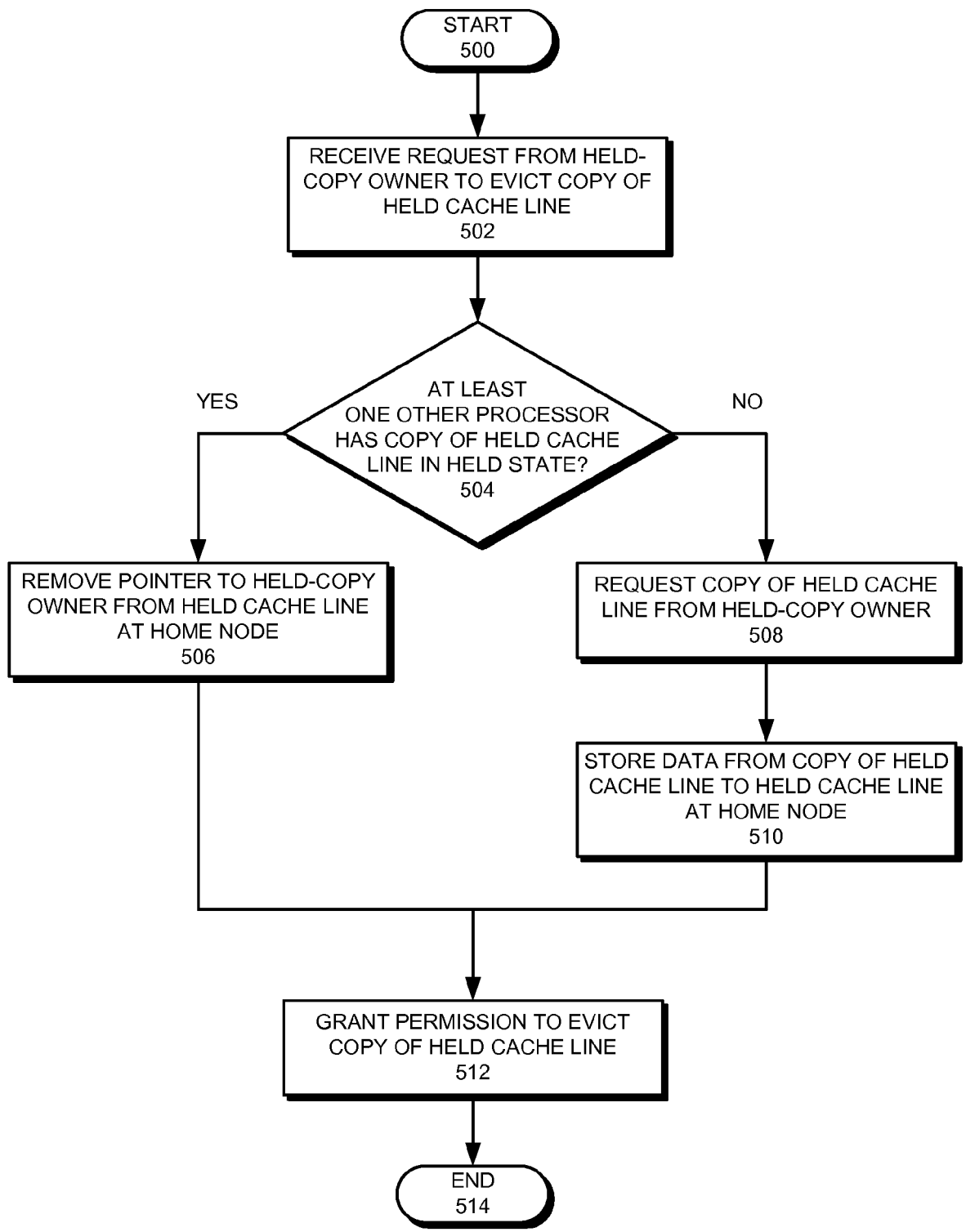
FIG. 5 presents a flowchart illustrating a process for acknowledging a request to evict a held cache line in accordance with embodiments of the present invention.

FIG. 5 presents a flowchart illustrating a process for acknowledging a request to evict a held cache line in accordance with embodiments of the present invention. This process begins when directory 120 receives a request from a held-copy owner to evict the held-copy owner's copy of a held cache line (step 502). Recall that the held-copy owner is a processor/sharer which has a copy of the held cache line in the held state, and that because the held-copy owner may have the only copy of the cache line, the cache line may need to be written back to the home node before the cache line can be evicted by the held-copy owner.

Next, directory 120 determines if at least one other processor, i.e., a processor other than the held-copy owner, has a copy of the held cache line in the held state (step 504). For example, with reference to FIG. 3B, some embodiments of the present invention determine that at least one other processor has a copy of the held cache line in the held state by determining that sharer information (i.e., pointers HPTR 310 and HPTR 312), is stored in held cache line 230 at the home node.

If at least one other processor has a copy of the held cache line in the held state (step 504, Yes), directory 120 removes information that identifies the held-copy owner from the held cache line at the home node (step 506). For example, with reference to FIG. 3B, directory 120 can remove pointer HPTR 312 from held cache line 230. Alternatively, directory 120 can toggle a bit corresponding to the held-copy owner in a "bit-mask" in cache line 230. Then, directory 120 grants permission to the held-copy owner to evict the copy of the held cache line (step 512).

If no other processor has a copy of the held cache line in the held state (step 504, No), directory 120 sends a "PULL" request to the held-copy owner, i.e., a request to the held-copy owner to send the held-copy owner's copy of the held cache line to the home node (step 508).

Next, directory 120 stores data from the copy of the held cache line received from the held-copy owner in a data field of the held cache line at the home node (step 510). For example, with reference to FIG. 3A, directory 120 can store data 300 in cache line 230 at the home node. Storing data from the copy of the held cache line at the home node overwrites sharer information that was stored in the held cache line at the home node. Then, directory 120 grants permission to the held-copy owner to evict the held-copy owner's held copy of the held cache line (step 512). Alternatively, the PULL operation and the grant of permission can be combined into a single operation that retrieves that data from the last held-copy owner and simultaneously victimizes the cache line from the held-copy owner.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for maintaining cache coherency, comprising:
    receiving a request from a processor for a copy of a cache line in a shared state; and
    determining if there is space available for information that identifies the processor in a directory entry for the cache line;
    if so, providing the copy of the cache line to the processor in the shared state and adding information that identifies the processor to the directory entry for the cache line,
    otherwise, providing the copy of the cache line to the processor in a held state, and writing information that identifies the processor in a data field of the cache line at the home node for the cache line.

2. The method of claim 1, wherein determining if there is space available for information that identifies the processor in the directory entry for the cache line involves determining a number of processors that have received a copy of the cache line in the shared state and a number of processors that have a copy of the cache line in the held state.

3. The method of claim 2, wherein providing the copy of the cache line to the processor in the held state involves:
    if no processor has a copy of the cache line in the held state and exactly a predetermined number ("X") of the processors have received a copy of the cache line in the shared state:
    sending from the home node to the processor a copy of the cache line in the held state;
    updating the directory entry to indicate that at least some sharer information is held in the cache line at the home node; and
    clearing data in the cache line at the home node;
    otherwise, if one or more processors have a copy of the cache line in the held state:
    requesting that a copy of the cache line be sent from an existing sharer of the cache line to the processor in the held state.

4. The method of claim 3, wherein requesting a copy of the cache line be sent from an existing sharer involves requesting a copy of the cache line be sent from a processor that has a copy of the cache line in the held state or a processor that has a copy of the cache line in an owned state.

5. The method of claim 2, wherein providing the copy of the cache line to the processor in the shared state further comprises:
    if fewer than a predetermined number ("X") of the processors have received a copy of the cache line in the shared state and no processors have a copy of the cache line in the held state, sending the copy of the cache line in the shared state from the home node to the processor.

6. The method of claim 1, further comprising:
    receiving a request from a held-copy owner to evict a copy of a held cache line;

determining if at least one other processor has a copy of the held cache line in the held state;

if so, removing information that identifies the held-copy owner from the held cache line at the home node;

otherwise, if no other processor has a copy of the held cache line in the held state, requesting that a copy of the held cache line be sent to the home node from the held-copy owner, and storing at the home node data from the copy of the held cache line, thereby overwriting the information that identifies the held-copy owner; and granting permission to the held-copy owner to evict the copy of the held cache line.

7. The method of claim 1, wherein a processor that has a copy of a cache line in the shared state can evict the copy of the cache line without requesting permission to evict the copy of the cache line; and wherein a processor that has a copy of a cache line in the held state must request permission to evict a copy of the cache line and wait for acknowledgment to the request before evicting the copy of the cache line.

8. A computer system for maintaining cache coherency, comprising:

a processor;

a cache memory coupled to the processor, wherein the cache memory stores data for the processor; and a directory coupled to the processor and to the cache, wherein the directory is configured to:

receive a request from the processor for a copy of a cache line in a shared state; and determine if there is space available for information that identifies the processor in a directory entry for the cache line;

if so, provide the copy of the cache line to the processor in the shared state, and add information that identifies the processor to the directory entry for the cache line, otherwise, provide the copy of the cache line to the processor in a held state, and write information that identifies the processor in a data field of the cache line at the home node for the cache line.

9. The computer system of claim 8, wherein when determining if there is space available for information that identifies the processor in the directory entry for the cache line, the directory is configured to determine a number of processors that have received a copy of the cache line in the shared state and a number of processors that have a copy of the cache line in the held state.

10. The computer system of claim 9, wherein when providing the copy of the cache line to the processor in the held state, the directory is configured to:

if no processor has a copy of the cache line in the held state and exactly a predetermined number ("X") of the processors have received a copy of the cache line in the shared state:

send from the home node to the processor a copy of the cache line in the held state;

update the directory entry to indicate at least some sharer information is held in the cache line at the home node; and clear data in the cache line at the home node;

otherwise, if one or more processors have a copy of the cache line in the held state:

request that a copy of the cache line be sent from an existing sharer of the cache line to the processor in the held state.

11. The computer system of claim 10, wherein when requesting that a copy of the cache line be sent from an existing sharer, the directory is configured to request that a copy of the cache line be sent from a processor that has a copy of the cache line the held state or a processor that has a copy of the cache line in an owned state.

12. The computer system of claim 9, wherein when providing the copy of the cache line to the processor in the held state, the directory is configured to:

if fewer than a predetermined number ("X") of the processors have received a copy of the cache line in the shared state and no processors have a copy of the cache line in the held state, send the copy of the cache line in the held state from the home node to the processor.

13. The computer system of claim 8, wherein the directory is further configured to:

receive a request from a held-copy owner to evict a copy of a held cache line;

determine if at least one other processor has a copy of the held cache line in the held state;

if so, remove information that identifies the held-copy owner from the held cache line at the home node;

otherwise, if no other processor has a copy of the held cache line in the held state, request that a copy of the held cache line be sent to the home node from the held-copy owner, and store at the home node data from the copy of the held cache line, thereby overwriting the information that identifies the held-copy owner; and grant permission to the held-copy owner to evict the copy of the held cache line.

14. The computer system of claim 8, wherein metadata for the directory entry for the cache line is stored in parity bits of an ECC memory module.

15. A directory for maintaining cache coherency, wherein the directory is configured to:

receive a request from the processor for a copy of a cache line in a shared state; and determine if there is space available for information that identifies the processor in a directory entry for the cache line;

if so, provide the copy of the cache line to the processor in the shared state, and add information that identifies the processor to the directory entry for the cache line, otherwise, provide the copy of the cache line to the processor in a held state, and write information that identifies the processor in a data field of the cache line at the home node for the cache line.

16. The directory of claim 15, wherein when determining if there is space available for information that identifies the processor in the directory entry for the cache line, the directory is configured to determine a number of processors that have received a copy of the cache line in the shared state and a number of processors that have a copy of the cache line in the held state.

17. The directory of claim 16, wherein when providing the copy of the cache line to the processor in the held state, the apparatus is configured to:

if no processor has a copy of the cache line in the held state and exactly a predetermined number ("X") of the processors have received a copy of the cache line in the shared state:

send from the home node to the processor a copy of the cache line in the held state;

update the directory entry to indicate at least some sharer information is held in the cache line at the home node; and clear data in the cache line at the home node;

otherwise, if one or more processors have a copy of the cache line in the held state:

request that a copy of the cache line be sent from an existing sharer of the cache line to the processor in the held state.

18. The directory of claim 17, wherein when requesting that a copy of the cache line be sent from an existing sharer, the directory is configured to request that a copy of the cache line be sent from a processor that has a copy of the cache line in one of the held state, or an owned state.

19. The directory of claim 15, wherein the directory is further configured to:

receive a request from a held-copy owner to evict a copy of a held cache line;

determine if at least one other processor has a copy of the held cache line in the held state; and if so, remove information that identifies the held-copy owner from the held cache line at the home node;

otherwise, if no other processor has a copy of the held cache line in the held state, request that a copy of the held cache line be sent to the home node from the held-copy owner, and store at the home node data from the copy of the held cache line, thereby overwriting the information that identifies the held-copy owner; and grant permission to the held-copy owner to evict the copy of the held cache line.

* * * * *